(12) United States Patent
Chien

(10) Patent No.: US 7,495,839 B2
(45) Date of Patent: Feb. 24, 2009

(54) LENS WITH IR-CUT FUNCTION

(75) Inventor: Shih-Che Chien, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 28 days.

(21) Appl. No.: 11/309,310

(22) Filed: Jul. 25, 2006

(65) Prior Publication Data

US 2007/0171534 A1    Jul. 26, 2007

(30) Foreign Application Priority Data

Jan. 13, 2006   (CN)   ................ 200610032956.5

(51) Int. Cl.
*G02B 3/00* (2006.01)
*G02B 13/14* (2006.01)
*G02B 5/22* (2006.01)

(52) U.S. Cl. .................. 359/642; 359/356; 359/885

(58) Field of Classification Search ............... 359/642, 359/350, 355–357, 885
See application file for complete search history.

(56) References Cited

U.S. PATENT DOCUMENTS

2006/0068154 A1\* 3/2006 Parce et al. ............... 428/76
2006/0275596 A1\* 12/2006 Payne et al. ............... 428/323

\* cited by examiner

*Primary Examiner*—Scott J Sugarman
(74) *Attorney, Agent, or Firm*—Andrew C. Cheng

(57) ABSTRACT

A lens (10) and a method for forming the lens (10). The lens (10) including a base (12) with plurality of nano-particles (14) therein. The base (12) is made of glass. The nano-particles (14) can filter infrared rays from incoming light and are evenly distribute throughout the base. The method for forming a lens includes: (1) preparing a glass pre-form (60) with nano-particles (14) for filtrating infrared rays; (2) pressing the glass pre-form (60) using a press mold machine (500) to mold a lens (10).

14 Claims, 3 Drawing Sheets

LENS WITH IR-CUT FUNCTION

FIELD OF THE INVENTION

The present invention relates to lenses for digital camera modules and, more particularly, to lenses for digital camera modules with IR-cut (infrared-cut) function.

DESCRIPTION OF RELATED ART

Currently, digital camera modules are included as a feature in a wide variety of portable electronic devices. As portable electronic devices have become progressively more miniaturized over time, digital camera modules have correspondingly also become smaller and smaller. Nevertheless, consumers demand digital camera modules which are not only miniaturized but which are also capable of high quality imaging. The image quality of a digital camera mainly depends upon the optical elements of the digital camera module.

A digital camera module includes a lens and an image sensor such as charge coupled device (CCD), or complementary metal oxide semiconductor (CMOS). The image sensor is preferably sensitive not only to visible light, but also to infrared rays, thus, the received infrared rays may result in lowering of resolution or deterioration of image. Therefore, in order to prevent infrared rays from reaching the image sensor, an infrared filter is always disposed in front of the lens. However, these digital camera modules still require miniaturizing.

Some manufacturers apply a dielectric multilayer film constituting the infrared ray filter onto the lens, and eliminate the infrared ray filter as a component thus allowing smaller construction. However, in order to fabricate such a lens, highly accurate fabricating technology is required since it is hard to design and control the fabricating procedure.

Therefore, a lens for a camera is desired in order to overcome the above-described shortcomings.

SUMMARY OF THE INVENTION

In one embodiment thereof, a lens including a base with a plurality of nano-particles therein. The base is made of glass or plastic material. The nano-particles can filter out infrared rays and are evenly distributed throughout the base. The lens thus combines the capabilities of common lenses and filters.

In another aspect of the present lens with IR-cut function, a method for forming a lens includes: (1) preparing a glass pre-form with plurality of nano-particles for filtrating infrared rays; (2) pressing the glass pre-form using a press mold machine to form a lens. The method of present invention for forming the lens, i.e. mixing the nano-particles into the molten glass in a manner so as to give the lens the ability to filter out the infrared rays from incoming light, may easily be carried out and avoids complex film-application processes.

Other advantages and novel features will become more apparent from the following detailed description when taken in conjunction with the accompanying drawings.

BRIEF DESCRIPTION OF THE DRAWINGS

Many aspects of the lens for a camera can be better understood with reference to the following drawings. The components in the drawings are not necessarily drawn to scale, the emphasis instead being placed upon clearly illustrating the principles of the present lens for a camera and its potential applications. Moreover, in the drawings, like reference numerals designate corresponding parts throughout the several views.

DETAILED DESCRIPTION OF THE INVENTION

Figure 1:
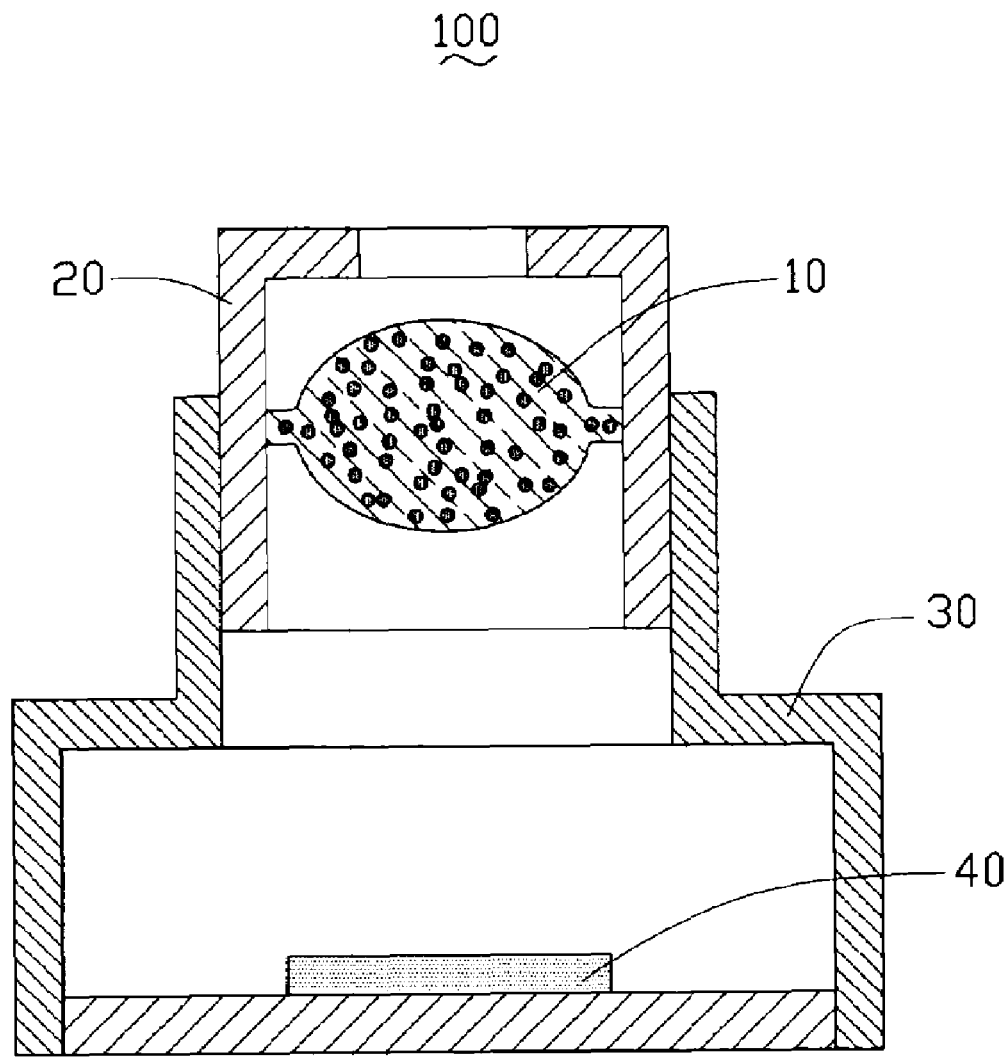
FIG. 1 is a schematic view of a digital camera module which a lens is applied to, according to one preferred embodiment of the present invention.

Referring to FIG. 1, in a preferred embodiment, a lens 10 is applied to a digital camera module 100. The digital camera module 100 includes a barrel 20, a holder 30, and an image sensor 40. The lens 10 is received in a front end portion of the barrel 20. The image sensor 40 is disposed in a rear end portion of the holder 30. The lens 10 can filter the infrared rays out of incoming light and focus the remaining rays onto the image sensor 40.

Figure 2:
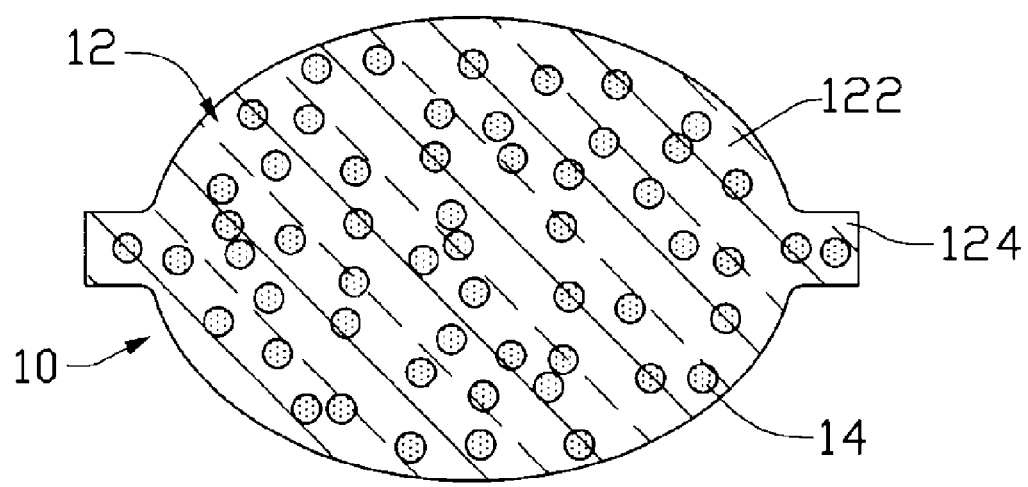
FIG. 2 is a schematic view of the lens shown in FIG. 1.

Referring to FIG. 2, in this preferred embodiment, the lens 10 includes a transparent base 12, and a plurality of nano-particles 14 distributed uniformly in the base 12.

The base 12, made of glass or transparent plastic material, includes an optical portion 122 and a fixing portion 124. The optical portion 122 and the fixing portion 124 around the optical portion 122 are formed together. The optical portion 122 is used to focus light. The fixing portion 124 can be fixed to the barrel 20.

The nano-particles 14, uniformly distributed in the base 12 can filter out infrared rays and ultraviolet radiation.

The nano-particles 14 can consist of light selective absorption material such as silicon oxide ($SiO_2$), titanium oxide ($TiO_2$), and zinc oxide ($ZnO$). The different materials have different characteristics, for example, silicic acid ester ($SiO_2$) and titanium oxide ($TiO_2$) both have high levels of absorption of infrared rays and ultraviolet radiation, zinc oxide ($ZnO$) has high levels of absorption of infrared rays and high levels of reflection of ultraviolet radiation. Therefore, the material of the nano-particles 14 can be selected according to requirement. The light selective absorption material can absorb the infrared rays and dissipate the absorbed energy. The light selective absorption material, uniformly distributed in the base 12, appears transparent, and visible light can pass through the lens 10.

Upconversion fluorescence material (i.e. material which absorbs photons at lower energy levels and re-emits photons at higher energy levels) such as rare earth compounds and rare earth dopants can also be used to form the nano-particles 14. The rare earth dopants include basic material such as oxides, fluorides and sulfides. The upconversion fluorescence materials include rare earth elements having unstable physical properties. The rare earth elements include lanthanum (La), cerium (Ce), praseodymium (Pr), neodymium (Nd), promethium (Pm), samarium (Sm), Europium (Eu), gadolinium (Gd), terbium (Tb), dysprosium (Dy), holmium (Ho), erbium (Er), thulium (Tm), ytterbium (Yb), lutetium (Lu), scandium (Sc), and yttrium (Y). The electron transition occurring when the atom of the rare earth element has absorbed certain photons with low energy and a photon with high energy is re-released. Therefore, when the light passing through the lens 10 including a rare earth element or elements, the infrared rays are absorbed and re-released as visible radiation.

The proportion by mass of the nano-particles 14 in the lens 10 is in the approximate range from 5%~20%, whereby the infrared rays can be filtered by the lens 10 and the visible light can pass through the lens 10.

The lens 10 combines the capabilities of the common lens with those of the common filter and allows greater miniaturization of the digital camera module 100 whilst also enabling more efficient production.

Figure 3:
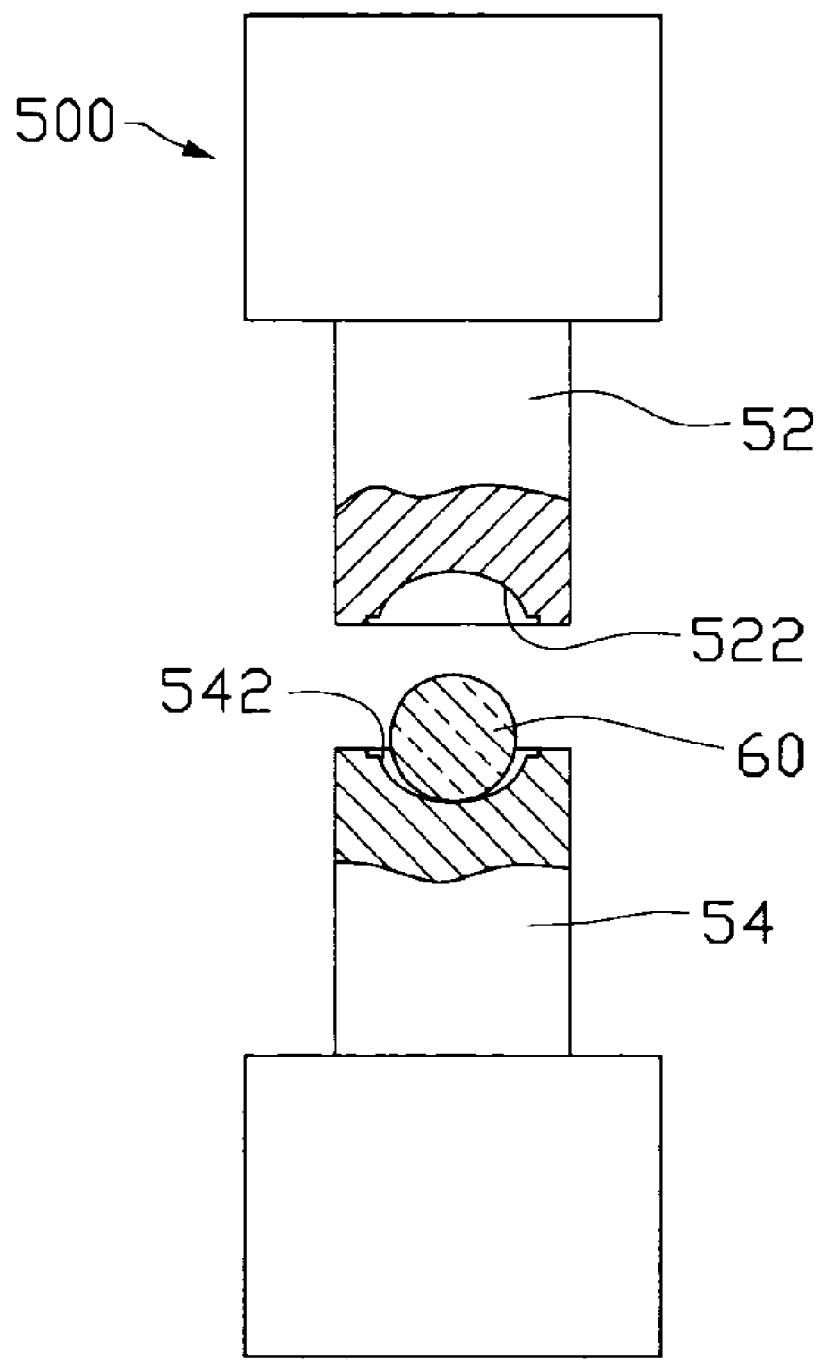
FIG. 3 is a schematic view of the process of molding the lens shown in FIG. 1.

Referring to FIG. 3, the manufacturing of the lens 10, whose base is made of glass in the preferred embodiment, uses molding technology. The method of the present invention for forming the lens 10, includes the steps of:

preparing glass material and heating the glass material until it is molten;

mixing in the nano-particles 14 so that nano-particles 14 form a proportion by mass from 5%~20% of the molten glass, whilst distributing the nano-particles 14 uniformly throughout the molten glass;

cooling the molten glass to form granular glass pre-forms 60;

preparing a press molding machine 500 and molding the glass pre-forms 60.

In the second step, a mixing machine is provided and used to mix the molten glass, so as to distribute the nano-particles 14 evenly throughout the molten glass.

In the third step, the shape of the glass pre-forms 60 is spherical or ovoid.

In the fourth step; the press molding machine 500 includes top die 52 and lower die 54, wherein the top die 52 has a top core 522 and the lower die 54 has a bottom core 542. The configuration of the top core 522 and that of the bottom core 542 are the same, whereby the shape of the cavity between the top core 522 and the bottom core 542, which is formed when the top die 52 firmly meets the lower die 54, is the same as that of the lens 10.

The method for forming the lens 10, mixing the nano-particles 14 into the molten glass as to give the lens 10 the ability to filter out incoming infrared rays, may be easily carried out and avoids complex film-application processes.

It is understood that the lens 10 can be applied to other optical equipment; the fixing portion 124 can be omitted.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A lens, comprising:
    a base; and
    a plurality of nano-particles distributed in the base, the nano-particles being configured for filtering infrared rays from incoming light, the nano-particles consisting one of upconversion fluorescence material and absorption material selected from the group consisting of silicon oxide and titanium oxide.

2. The lens as claimed in claim 1, wherein the base is made of glass and the nano-particles are distributed in the base uniformly.

3. The lens as claimed in claim 1, wherein the range of the proportion of the nano-particles in the base by mass is from 5 percent to 20 percent.

4. The lens as claimed in claim 1, wherein the upconversion fluorescence material is chosen from the group consisting of rare earth compounds and rare earth dopants.

5. The lens as claimed in claim 1, wherein the base includes an optical portion and a fixing portion around the optical portion.

6. A digital camera module comprising:
    a holder;
    a barrel received in the holder;
    a lens received in the barrel, the lens including a base and a plurality of nano-particles distributed in the base, the nano-particles being configured for filtering infrared rays out of incoming light, the nano-particles consisting one of upconversion fluorescence material and absorption material selected from the group consisting of silicon oxide and titanium oxide; and
    an image sensor arranged to receive light transmitted through the lens.

7. The digital camera module as claimed in claim 6, wherein the base is made of glass and the nano-particles are uniformly distributed throughout the base.

8. The digital camera module as claimed in claim 6, wherein the range of the proportion by mass of the nano-particles in the base is from 5 percent to 20 percent.

9. The digital camera module as claimed in claim 6, wherein the upconversion fluorescence material is chosen from the group consisting of rare earth compounds and rare earth dopants.

10. A method for forming a lens, comprising:
    preparing a glass pre-form with nano-particles for filtering infrared rays from incoming light, the nano-particles consisting one of upconversion fluorescence material and absorption material selected from the group consisting of silicon oxide and titanium oxide;
    pressing the glass pre-form with a press mold machine to mold a lens.

11. The method as claimed in claim 10, wherein the method of preparing the glass pre-form comprises:
    heating a glass material to be molten glass;
    mixing the nano-particles into the molten glass and evenly distributing the nano-particles throughout the molten glass;
    cooling the molten glass to form glass pre-forms.

12. The method as claimed in claim 11, wherein the range of the proportion by mass of the nano-particles in the molten glass is between 5 percent to 20 percent.

13. The method as claimed in claim 11, wherein the shape of the glass pre-form is spherical or oval.

14. The method as claimed in claim 11, wherein a mixing machine is provided which is used to mix the molten glass so as to distribute the nano-particles uniformly.

* * * * *